REPRODUCING PANELS AND DEVICES FOR SCANNING REPRODUCING PANELS

Filed July 15, 1958 2 Sheets-Sheet 1

INVENTOR
GESINUS DIEMER
JOHANNES GERRIT VAN SANTEN
SIMON DUINKER
WIJNAND JOHANNES SCHOENMAKERS
BY
Frank R. Jifari
AGENT

REPRODUCING PANELS AND DEVICES FOR SCANNING REPRODUCING PANELS

Filed July 15, 1958 2 Sheets-Sheet 2

INVENTOR
GESINUS DIEMER
JOHANNES GERRIT VAN SANTEN
SIMON DUINKER
WIJNAND JOHANNES SCHOENMAKERS
BY
Frank R. Jifari
AGENT United States Patent Office 2,967,266

Patented Jan. 3, 1961

2,967,266

REPRODUCING PANELS AND DEVICES FOR SCANNING REPRODUCING PANELS

Gesinus Diemer, Johannes Gerrit van Santen, Simon Duinker, and Wijnand Johannes Schoenmakers, all of Eindhoven, Netherlands, assignors to North American Philips Company, Inc., New York, N.Y., a corporation of Delaware Filed July 15, 1958, Ser. No. 748,753

Claims priority, application Netherlands July 15, 1957

11 Claims. (Cl. 315—169)

The invention relates to reproducing panels intended for converting electrical signals into a radition pattern; this panel comprises a support, to which are applied elements united in a flat pattern, provided with electrodes and containing a substance capable of emitting radiation or extinguishing under the action of applied voltages, to which elements are added photo-conductive elements which are arranged relatively to one another in a manner such that the radiation produced by the first-mentioned elements strikes the photo-conductive elements only to a reduced extent.

Such panels are used inter alia for the reproduction of television images; subsequent to detection the television signal is then applied as a video signal to the reproducing panel.

With reproducing panels of this kind hitherto known, it has been common practice to provide two groups of conductors in the panel, one above the said radiating or extinguishing substance and the other below it; in this case the various control-voltages, among which is the video signal, have to be applied to the two groups of conductors, which requires a complicated, costly switching system.

The reproducing panel according to the invention mitigates this disadvantage and has the feature that provision is made of one or more tapped delay circuits, the tappings of which are coupled with the series combinations of radiating or extinguishing elements and photo-conductive elements joined to the former, the photo-conductive elements being arranged in the panel in a manner such that they can be irradiated from a source of radiation to be provided separately.

The device for scanning the reproducing panel is characterized in that the television signal is applied to one or more correctly terminated delay circuits and the photo-conductive elements are irradiated periodically from a source of radiation for short instants.

A few potential embodiments of the reproducing panel and the device will be described with reference to the figures.

Herein Fig. 1 is a plan of the reproducing panel in a potential embodiment in television. In this figure there is shown how several scanning systems are situated on a transparent supporting device, for example a glass support 5. Furthermore it shows how the scanning devices $a_1 \ldots a_n$ are electrically connected.

Fig. 2*a* is a perspective view of the panel.

Fig. 2*b* is a sectional view of a detail of the panel shown in Fig. 2*a* and

Fig. 2*c* shows a slightly modified arrangement of this detail.

Fig. 3 shows the electrical circuit diagram of the panel as it is used in the arrangement shown in Fig. 1.

Fig. 4 serves for further explanation and

Figures 1, 2A:
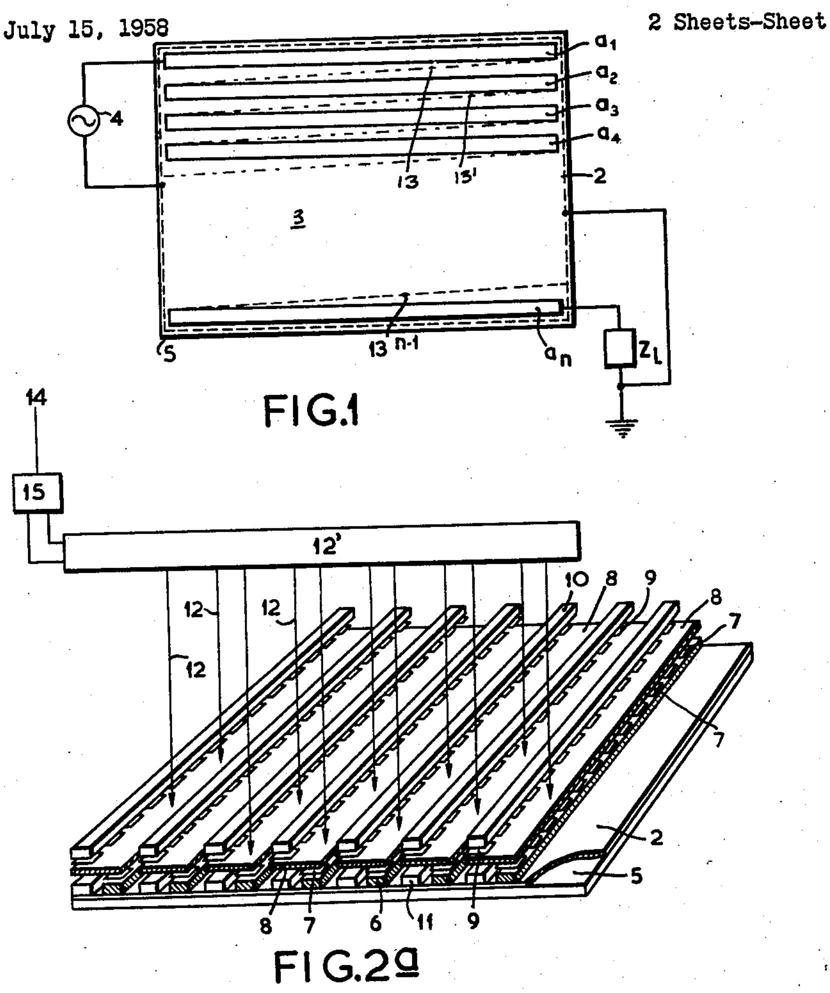
Fig. 1 is a plan view of the total reproducing panel with the scanning device. References $a_1$, $a_2 \ldots a_n$ designate the scanning systems, 4 designates the source of the video signal, 2 a transparent electrode, $z_1$ the terminal impedance and 13, 13′ and so on show the connections between the systems $a_1 \ldots a_n$.

Fig. 2*a* is a perspective view of the same panel. However in this figure the position of the scanning systems are shown in the vertical direction whereas in Fig. 1 they are shown in the horizontal direction. From Fig. 1 it is evident that each system *a* consists of: a delay circuit 10, islands 9 of electrically conductive material, for example metal islands, a photo-conductive strip 8, for example made of a composition of 50% activated CdS and 50% CdSe-powder and having a radiation-absorbing layer, for example a lacquer layer on the lower side, islands 7 of electrically conductive material, for example metal islands, a galvanically insulating strip 11, which must therefore have a high ohmic value and a low capacity, and a strip 6 which contains the radiating or field-quenched material. The former material may consist of chlorine, manganese 1000 p.p.m.-activated zinc-sulphide powder {ZnS (Cl,Mn)}. An example of the latter material (the so-called electrophotoluminescent material) is described in the article of G. Destriau and H. F. Ivey in P.I.R.E., 1955, pages 1911–1938, especially chapter III.

A photo-conductive substance is to be understood to mean a substance of which the specific electrical impedance can be reversed by corpuscular or electro-magnetic radiation.

Below these composite systems provision is made of the transparent electrode 2, which is in contact with the strips 6. The strips 11 serve to support the strip 8 and the delay circuit 10 lying thereon and to provide that a direct galvanic connection between the delay circuit 10 via the strip 8 to the electrode 2 is avoided.

It will be obvious that many other configurations are possible.

A further solution consists, for example, in that the strips 11 are omitted and the strips 6 are turned through 90°. The strips 6 then lie below the strips 8, which are thus adequately supported. The delay circuits 10 are applied in the same manner as shown in Fig. 2*a* or turned through 90° relatively to this position, while the islands 7 and 9 are to be arranged in a manner such that they do not short-circuit the strips 8. If necessary, both the strips 8 and the strips 6 may be united in layers, which then constitute a mosaic in order to avoid electrical random conductivity in the layers themselves.

Figure 2B:
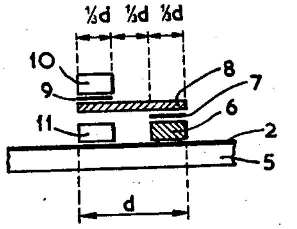
Figure 2C:
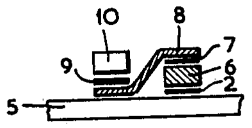

An alternative solution is shown in Fig. 2*c*, where the strips 11 are also omitted and the strips 8 exhibit a bend, so that they can bear on the one side on the plate 5 and on the other side of the strips 6. The delay circuits 10 are arranged on the strips 8 on the side where the latter bear on the plate 5. The positions of the islands 7 and 9 are identical with those shown in Fig. 2*a* and are shown in Fig. 2*c*. In order to prevent the circuits 10 from being in contact with the electrode 2, the latter is also constructed in the form of strips, these strips being connected to one another in a manner such that they may be considered together again as one transparent counter-electrode. From the latter it follows that, geometrically, the strips may be located wholly or partly in the same layer.

This complete structure is rigidly mounted on the support allowing the radiation to pass, for example the glass plate 5, which supports the whole system and which permits at the same time to render the radiation produced by the strips 6 observable. If the strips 6 are made of a substance with voltage - quenched, electrophotoluminescent properties, it producing a radiation subsequent to irradiation from a separate source, but extinguishing more or less as soon as a higher or lower voltage is applied, the television signal must be supplied in a negative sense in order to obtain a positive image.

A reversal of the image by means of an image amplifier (a so-called amplificon) is possible, if the television signal is supplied in a positive sense; then the radiation produced is additionally amplified. This also applies when use is made of a luminescent substance and the positive image is only amplified and is not reversed by the image amplifier.

Each system $a$ occupies a width $d$; by way of example, the delay circuit 10, the strip 11, the strip 6, metal islands 9 and 7 then have a width of $\frac{1}{3}d$, while the strip 8 has the total width $d$. This is shown in Fig. 2$b$. The relative distance between the systems $a$ will be minimized, in order to obtain an optimum definition of the image to be reproduced.

Each delay circuit 10 is provided with a plurality of tappings or terminals, which are connected via the islands 9 to narrow, transverse portions of the strip 8, which portions are connected via the islands 7 to narrow, transverse portions of the strip 6. The islands 7 and 9 serve to establish a satisfactory contact between the strips 10, 8 and 6 and the same time they operate as an electron container or supply.

If the part of a transverse portion of strip 8 which is not short-circuited by the islands 7 and 9 (the part of strip 8 designated by $\frac{1}{3}d$ in Fig. 2$b$ which part lies between 7 and 9) is considered as a variable resistance and the associated parts of strip 6 as capacitors, it may be assumed that at discreet, equidistant points, series combinations of R's and C's are provided between delay circuits 10 and the transparent electrode 2. The number of these series combinations per system will be equal to the number of islands 7 and 9 between one delay circuit 10 and one strip 6, for the electrodes 7 act as the contacts between the strips 6 and 8 and the electrodes 9 act as the contacts or taps between the strips 8 and the delay lines 10. This number of islands must furthermore be equal to the number of image points per line of the reproduced image. If, for example, 833 image points are assumed per line, there must be also 833 islands 9 and 833 islands 7 per system $a$.

Figure 3:
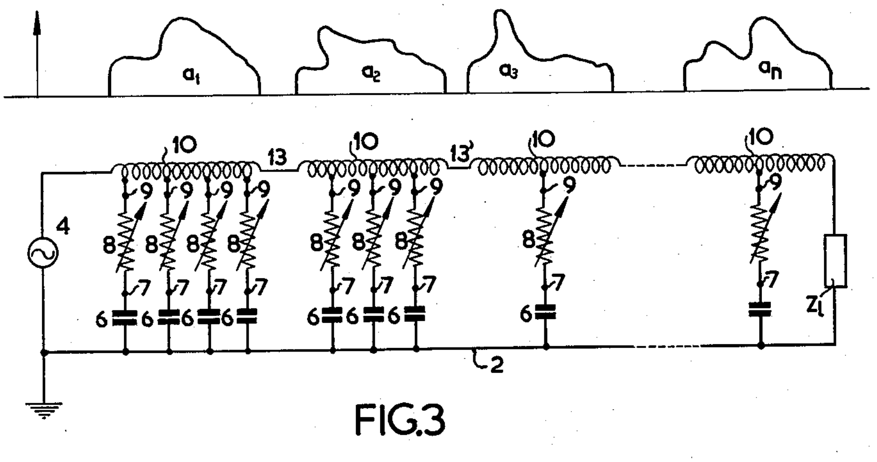

On the ground of the foregoing the electrical circuit diagram of Fig. 3 can now be drawn, corresponding parts being designated by the same references as in Fig. 2. The resistance values of the resistors 8 shown in Fig. 3 may be varied by irradiating the strips 8 from a source of radiation 12′; this radiation is indicated in Fig. 2 by the arrows 12.

The term "radiation" is to be understood to mean herein both visible and invisible light (ultraviolet and/or infrared light) and, furthermore, corpuscular radiation and electro-magnetic radiation. If necessary, precautions may be taken to provide that the flash of light cannot be observed on the bottom side of the glass plate and that the radiation produced by the elements of the strips 6 can penetrate into the strips 8 only to limited extent, so that reverse effects are avoided. To this end a layer which absorbs radiation can be applied to the bottom side of the strip 8, but also the radiation from the external source of radiation for the strips 8 may be made invisible for the spectator. It is also possible to make the photo-conductive substance sensitive only to the said radiation of the external source, so that the radiation of another kind produced by the elements of the strips 6 does not affect the photo-conductive elements.

The delay circuits 10 may be constructed in numerous ways. For example, a wire wound helically on an auxiliary mandril may, subsequent to removal of the mandril by etching, be baked in a material such as ferrite, having an $\epsilon_r$ of 20 and an $\mu_r$ of 100, in order to obtain the required time lag per delay circuit 10. If necessary, this structure may be spiralized or zigzagged, tappings being provided at the desired points of the delay circuit thus obtained to establish contacts with the islands 9.

A further possibility consists in the use of acoustical delay circuits. The electrical signals supplied to the delay circuits must then be converted at the inputs into acoustical signals, which, at all tappings and at the outputs are reconverted into electrical signals. This may be carried out, for example, with the aid of piezo-electric or piezo-magnetic elements.

For the sake of simplicity only a device with an electric delay circuit will be described herein.

If such delay circuits cannot be rendered transparent, the radiation surface per strip 8 must be confined to the surface between two delay circuits 10. The part operating as a resistance is then restricted to the non-short-circuited portion of the narrow strip between the islands 7 and 9 (see Fig. 2$b$).

The operation of the scanning mechanism can now be described with reference to Figs. 1 and 2 and the substitute diagram of Fig. 3.

The total video signal is supplied from the source 4 to the delay circuit 10 of the first line $a_1$ and traverses in succession the delay circuits of the system $a_1$, $a_2$ . . . $a_n$ to return via the surge terminal impedance $Z_1$ to the source 4. This impedance $Z_1$ serves to render the total delay circuit as it is shown in Fig. 2 as real as possible, so that reflections or absorptions at the end of the delay circuit are avoided.

If, for example, the system comprises 625 lines and 25 pictures per second, one line period is $$\frac{1}{625\times 25}\approx 64\ \mu\text{sec.}$$

With such a system 625 systems $a$ must be provided and if the time lag per delay circuit 10 is just 64 $\mu$sec., the total video signal supplied will be distributed over the reproducing panel 3 after $\frac{1}{25}$ sec.

At this instant a flash of radiation is produced, which strikes the strips 8, so that the resistance value of the photoconductive material decreases, which means that the resistors 8 shown in Fig. 3 are materially reduced in value. The resistance of this material may be rendered, in the absence of radiation, higher than $10^6$ ohm-cm. and in the case of a strong irradiation, lower than $10^3$ ohm-cm. The flash of radiation, produced by the source 12′, must be in synchronism with the video information delivered by the source 4. Therefore vertical synchronizing pulses are fed through a line 14 to an oscillator 15 which controls the radiation source 12′. The synchronizing pulses may be obtained from the source 4 or from another suitable point in the receiver.

Owing to this variation in resistance the voltage pattern distributed along the delay circuits 10 is capable of charging the capacitors 6. For example above the electrical circuit diagram in Fig. 3 there are shown several voltage patterns which are distributed along the several delay circuits $a_1$, $a_2$, $a_3$ . . . $a_n$ at the moment a certain flash of radiation is produced by the source 12′. Now each capacitor 6 will be charged up to a value depending upon the voltage occurring at the corresponding tap on the delay circuit. In accordance with the potential difference thus produced between the coatings of the capacitors the electro-luminescent substance between the coatings will emit light. If a ratio between height and width is assumed to be 4:3, there must be $4/3\times 625\approx 833$ image points per line, which number corresponds with the number of assumed islands 7 and 9, so that the strips 6 are divided, so to say, into 833 image points, which will emit light in the manner described above in accordance with the supplied video signal. During the emitting of light a small current will flow, so that it is possible to suppose a resistor in parallel with the capacitor 6, across which resistor the charge supplied via the delay circuit can leak away. This leaking away may take about $\frac{1}{25}$ sec., since then the next-following voltage pattern overflows the panel, so that at the next-following flash the capacitors are recharged.

In the absence of radiation the resistor 8 will be rather high, so that the capacitors 6 are hardly charged.

Figure 4:
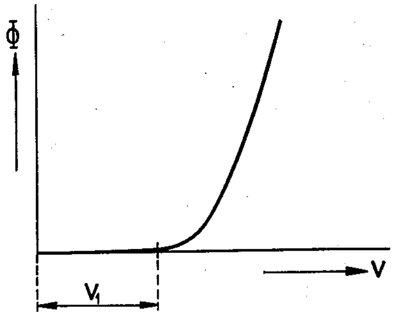

The small potential difference prevailing between the coatings (owing to a residual preceding charge and to the small charge produced on the coatings between two flashes) will not be capable of producing phosphorescence, to which always a given potential difference (threshold value) is required. This is illustrated in Fig. 4, in which the luminous flux $\phi$ is plotted as a function of the applied voltage V. It follows therefrom that up to the threshold value $V_1$ substantially no light is irradiated. In the case shown, in which the ZnS powder is activated by Cl, Mn, $V_1$ may be a direct voltage, but if use is made of a copper- or manganese-activator only alternating voltage can be employed. Therefore, for television purposes, the activator which also permits the use of a direct voltage is preferred. Moreover, by applying the Mn, Cl-activator the leakage resistor supposed to be in parallel with the capacitor 6 is lower, so that the charge at 6 can leak away with the desired speed.

During the leaking away of the capacitors 6 light is irradiated so that the total luminous output per image point is approximately equal to the mean value of the luminous flux $\phi$, varying with time, multiplied by the time interval between two flashes.

A further method consists in that the 625 systems are divided into two groups, one group containing odd-numbered systems $a_1$, $a_3$ . . . and one group containing even-numbered systems $a_2$, $a_4$ . . ., in which the input of a delay circuit of an odd-numbered group is connected to the output of the preceding delay circuit of this group and the inputs and outputs of the delay circuits of the even-numbered group are connected in the same manner to one another, while the odd-numbered and even-numbered delay circuits thus formed are terminated each with its characteristic impedance. The source 4, which supplies the video signal built up in accordance with the interlaced method, is first connected to the system $a_1$ of the first group and, after 1/50 sec. to the system $a_2$ of the second group. The desired voltage pattern will be distributed after 1/50 sec. over the first group, after which a flash of radiation causes the associated image points to emit light; during the next-following 1/50 sec. the voltage pattern is distributed over the second group and a second flash of radiation causes the image points associated with this group to emit light.

It should be noted that the attenuation of the signal after it has traversed the delay circuit, can be compensated, for example by providing amplifying stages in the interconnections between the delay circuits. Such small amplifying stages may be obtained, for example by means of transistors.

A second measure to compensate the losses in the delay circuits consists in the provision of a filter on the strips 8 in a manner such that the intensity of the radiation increases in the direction from the input to the output of the delay circuit, so that the photo-conductivity in this direction increases and, in spite of the voltage drop across the delay circuit, the voltages applied to the capacitors 6 are nearly proportional to the supplied video signal. As an alternative, the sensitivity of a strip 8 may be modified by varying the thickness thereof, so that the losses in a delay circuit are also compensated in this way. If, nevertheless, the luminous output is still insufficient, the image may be intensified by means of an image amplifier, as stated above.

Figure 5:
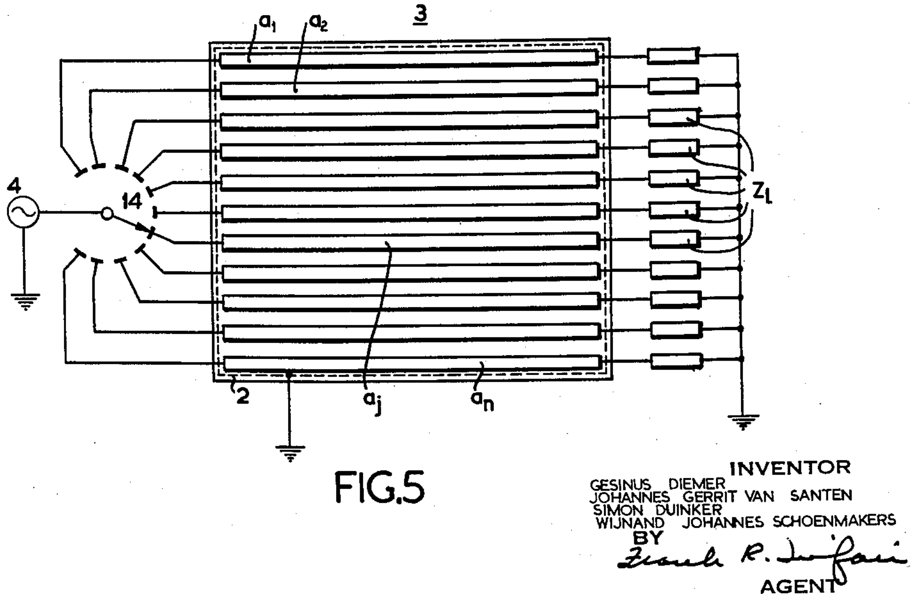
Fig. 5 shows the panel in a different use for television purposes.

A third method of scanning is shown in Fig. 5. In this figure, in which corresponding parts are designated by the same references as in Fig. 1, each system $a$ is connected in order of succession by means of a switch 14 to the source 4 for one line period. The information for the system concerned (for example the system $a_j$) is then distributed during one line period over the associated delay circuit 10, which is terminated by its characteristic impedance $Z_1$. After one line period, in this example after 64 $\mu$sec., a flash of radiation is produced to cause the image points associated with the system $a_j$ to emit light. Then the switch 14 connects the source 4 to the system $a_{j+1}$, after which the process is repeated.

Also in this case interlacing may be carried out in a simple manner by causing the switch 14 to scan first the odd-numbered systems $a_1$, $a_3$ . . . and then the even-numbered systems $a_2$, $a_4$ . . . . As a matter of fact, the supplied video signal, in this example of interlaced scanning, must be built up in accordance with the interlacing principle.

Of course, also a spiral scan is possible by applying the composite lines in spirals on the transparent electrode 2. As an alternative, only one system $a$ may be used, to which the total video signal is supplied and which receives a flash of radiation after each line period. The light thus produced can be projected onto a screen one line after the other with the aid of a rotating lens or mirror system.

What is claimed is:

1. A display device of the type comprising plural voltage-responsive means for displaying the information present in a time-varying video signal containing image information recurring in consecutive scanning intervals, and including means for receiving said time-varying video signal and converting the image information in a scanning interval into space-displaced voltages available at plural terminals, and means including plural radiation-responsive mean each coupling one of the plural voltage-responsive means to one of the plural terminals and a periodically-pulsing radiation source for transferring said plural voltages corresponding to the video information for a scanning interval simultaneously to plural voltage-responsive means once during each scanning interval.

2. A display device comprising plural voltage-responsive luminescent elements, plural photo-conductive elements, electrode means coupling each luminescent element in series with a photo-conductive element, a plural-tapped delay circuit directly coupled to the series-connected elements, means for applying a video signal to the delay circuit, and means for periodically uniformly irradiating the photo-conductive elements.

3. A display panel comprising a support and on the support, in the order named, a first common conducting element, plural voltage-responsive electro-luminescent elements, second conductive elements contacting the electro-luminescent elements, plural photo-conductive elements, third conducting elements contacting the photo-conductive elements, a plural-tapped delay circuit whose taps are connected to the third conducting elements, means for coupling a video signal to the delay circuit, and means synchronized with the video signal for periodically irradiating the photoconductive elements.

4. A panel as set forth in claim 3 wherein means are provided for introducing a video signal containing image information in consecutive scanning intervals into the delay circuit and means are provided for energizing for a short time interval the irradiating means at the end of each scanning interval.

5. A panel as set forth in claim 3 wherein the photo-conductive and electro-luminescent elements are optically dissociated.

6. A panel as set forth in claim 5 wherein the electro-luminescent elements luminesce in a spectral region different from that produced by the irradiating means, and the photo-conductive elements are mainly responsive to the radiation of the irradiating means.

7. A display panel comprising a transparent support and on the support a first transparent electrode, adjacent strips of insulating material and an electro-luminescent material on the electrode, conducting islands on the electro-luminescent strip, a strip of photo-conductive material overlying the insulating and electro-luminescent strips and containing an exposed surface, further conducting islands on the photo-conductive strip overlying the insulating strip, a plural-tapped delay circuit whose taps are connected to the last-named conducting islands, means for coupling a video signal to the delay circuit, and means synchronized with the video signal for periodically irradiating the photo-conductive strip.

8. A display panel as set forth in claim 7 wherein the strips, conducting islands and delay circuit constitute one line-image-producing assembly, and plural such assemblies are provided in a linear array.

9. A panel as set forth in claim 7 wherein means are provided for introducing a video signal at one end of the delay circuit, and the other end of the delay circuit is terminated in its characteristic impedance.

10. A panel as set forth in claim 9 wherein a radiation attenuating graded filter strip is interposed between the photo-conductive strip and the irradiating means such that the radiation in the vicinity of the introducing end of the delay circuit is of less intensity than at the opposite end.

11. A display panel comprising a support, a transparent conductive strip on the support, a strip of electro-luminescent material on the conductive strip, conducting islands on the electro-luminescent strip, a strip of photo-conductive material overlying a portion of the support and the electro-luminescent strip and containing an exposed surface, further conducting islands on the photo-conductive strip overlying the support, a plural-tapped delay circuit whose taps are connected to the last-named conducting islands, and means for periodically uniformly irradiating the photo-conductive strip.

References Cited in the file of this patent

UNITED STATES PATENTS

| | | |
|---|---|---|
| 2,818,531 | Peek | Dec. 31, 1957 |
| 2,836,766 | Halstead | May 27, 1958 |
| 2,882,419 | Diemer et al. | Apr. 14, 1959 |
| 2,883,556 | Jenny et al. | Apr. 21, 1959 |

UNITED STATES PATENT OFFICE
CERTIFICATE OF CORRECTION

Patent No. 2,967,266 January 3, 1961

Gesinus Diemer et al.

It is hereby certified that error appears in the above numbered patent requiring correction and that the said Letters Patent should read as corrected below.

Column 1, line 18, for "radition" read -- radiation --; line 57, after "plan" insert -- view --.

Signed and sealed this 19th day of September 1961.

(SEAL)
Attest:

ERNEST W. SWIDER
Attesting Officer

DAVID L. LADD
Commissioner of Patents

USCOMM-DC